United States Patent
Obkircher et al.

(10) Patent No.: US 8,272,598 B2
(45) Date of Patent: Sep. 25, 2012

(54) LOAD DISCONNECTION LOCK

(75) Inventors: Bernt Obkircher, Horgenzell (DE);
Peter Weimer, Markdorf (DE)

(73) Assignee: EADS Deutschland GmbH, Ottobrunn (DE)

( * ) Notice: Subject to any disclaimer, the term of this patent is extended or adjusted under 35 U.S.C. 154(b) by 427 days.

(21) Appl. No.: 12/693,026

(22) Filed: Jan. 25, 2010

(65) Prior Publication Data

US 2011/0180668 A1   Jul. 28, 2011

(51) Int. Cl.
*B64D 17/38* (2006.01)
(52) U.S. Cl. .................................. 244/151 B; 24/579.11
(58) Field of Classification Search ............. 244/151 B, 244/151 A; 24/579.11, 573.11, 265 R; 294/82.25
See application file for complete search history.

(56) References Cited

U.S. PATENT DOCUMENTS

| | | | | |
|---|---|---|---|---|
| 2,919,154 A * | 12/1959 | Schart | ........................ | 294/82.25 |
| 3,028,187 A | 4/1962 | Cahill et al. | | |
| 3,766,611 A * | 10/1973 | Gaylord | ........................ | 24/603 |
| 3,952,381 A * | 4/1976 | Barbe | ........................ | 24/602 |
| 3,994,049 A * | 11/1976 | Johansen et al. | ........................ | 24/602 |
| 5,687,931 A * | 11/1997 | Hogan | ........................ | 244/151 B |
| 6,257,524 B1 * | 7/2001 | Fitzgerald et al. | ........................ | 244/142 |
| 7,264,205 B2 * | 9/2007 | Fox, Jr. | ........................ | 244/151 B |
| 7,377,567 B2 * | 5/2008 | Walsh | ........................ | 294/82.28 |
| 8,033,507 B2 * | 10/2011 | Fox, Jr. | ........................ | 244/151 B |
| 2009/0095845 A1 * | 4/2009 | Hansson et al. | ........................ | 244/151 B |

FOREIGN PATENT DOCUMENTS

| | | |
|---|---|---|
| DE | 1 242 457 A | 6/1967 |
| DE | 25 03 936 | 1/1975 |
| EP | 1 619 975 B1 | 2/2006 |

OTHER PUBLICATIONS

German Search Report dated Dec. 23, 2009 (Three (3) pages).

* cited by examiner

*Primary Examiner* — Christopher P Ellis
(74) *Attorney, Agent, or Firm* — Crowell & Moring LLP

(57) ABSTRACT

A load disconnection lock having a locking device which is secured against unlocking by means of a safety device as long as the tensile load is not less than a predefined minimum value, and which unlocks automatically when the tensile load is less than the predefined minimum value. A second safety device is provided for the locking device and has a fluid-filled housing in which a piston is guided. The piston has a tensile load applied to it and has a hole as a flow channel for the fluid, such that the fluid can be exchanged between two housing subareas on both sides of the piston. The piston is connected to an activation slide which releases the locking device as soon as the piston has moved through a predetermined distance.

3 Claims, 1 Drawing Sheet

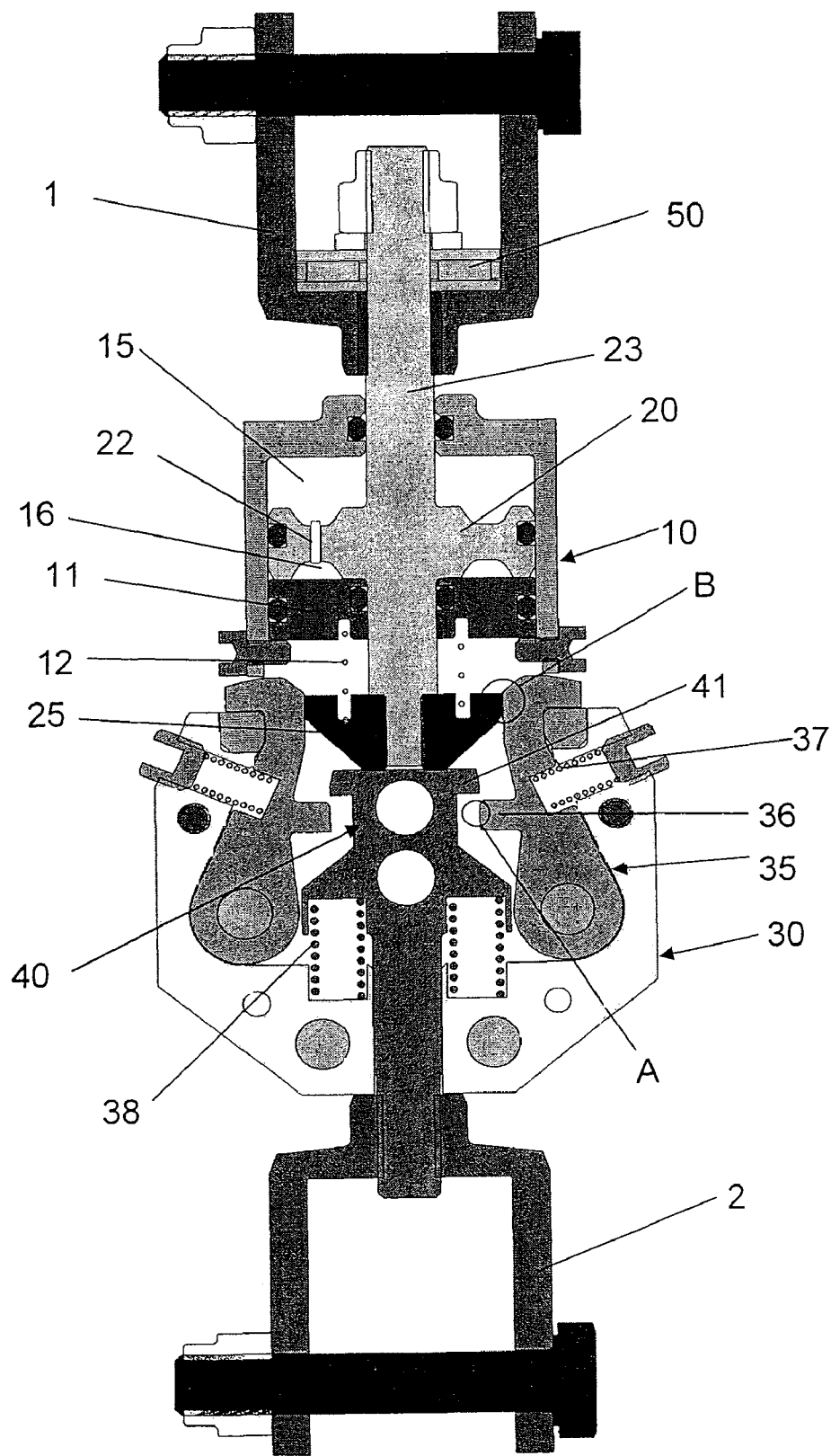

LOAD DISCONNECTION LOCK

BACKGROUND AND SUMMARY OF THE INVENTION

The present invention relates to a load disconnection lock for disconnecting a load from a line when the tension on the line is less than a specific value. Particular fields of application include parachutes or paragliders, in which such load disconnection locks are used to disconnect the load from the parachute immediately after landing, so that it cannot be dragged along the ground by the parachute (e.g., by a side wind) and damaged.

Load disconnecting locks of widely different types are known. See, for example, German patent document DE-OS 25 03 936, European patent document EP 1 619 975 B1 and U.S. Pat. No. 3,028,187, in which load disconnection locks have the common feature that when they are in the activated state, they are initiated immediately after a defined limit load is undershot.

However, because of the capability of their lines to stretch, modern parachute systems can oscillate, so that the load oscillates upwards and downwards a number of times under the parachute, after the shock of its opening. At the upper reversal point of this oscillation, the tension on the line is low and, in certain cases, may even briefly disappear completely. Therefore, a load disconnection lock of a convention type would be actuated immediately in a situation such as this, and the load would fall to the ground from the height at which the parachute opened; that is, from a relatively great height.

One object of the invention, therefore, is to provide a load disconnection lock which is protected against inadvertent opening in the course of the opening shock on the parachute.

This and other objects and advantages are achieved by the load disconnection lock according to the invention, which includes a first safety device that protects the locking device of the load disconnection lock from unlocking as long as the tensile load is not less than a predefined limit value, and a further safety device, which allows the locking device to be unlocked only after a defined and adjustable delay time has elapsed.

The load disconnection lock according to the invention reacts to tension relief only after this delay time. If the limit load is undershot during this time (for example, in the course of the opening shock), then unlocking cannot take place.

This delay time is provided by a fluid-filled housing in which a piston to which the tensile load is applied is guided. The piston has a hole as a flow channel for the fluid, such that the fluid can be exchanged between two housing subareas on both sides of the piston. The piston itself is connected to a slide which releases the locking device as soon as the piston has moved through a predetermined distance within the housing. The locking device therefore cannot be unlocked until the load disconnection lock has already been subjected to a load for a certain time.

Other objects, advantages and novel features of the present invention will become apparent from the following detailed description of the invention when considered in conjunction with the accompanying drawings.

BRIEF DESCRIPTION OF THE DRAWINGS

The single FIGURE shows an axial cross section through a load disconnection lock according to a representative embodiment of the invention.

DETAILED DESCRIPTION OF THE DRAWINGS

The load disconnection lock illustrated in the FIGURE is in the unactivated and unloaded state (that is, for example, in the state before it is used). It comprises a slide housing 10 and a catch housing 30. A connection for the parachute line is provided on the upper line connecting body 1, while a connection for the load line is provided on the lower line connecting body 2. The two housings 10, 30 are mechanically firmly connected to one another by two locking catches 35 in the catch housing 30. Two unlocking springs 37 push the locking catches 35 inwards, so as to unlock them. Likewise, a plurality of load springs 38 within the catch housing 30 press an axially moving initiation slide 40 upwards against the load. The initiation slide 40 is firmly connected to the line connecting body 2 for connection of the load line. The projections 36, 41 on the locking catch 35 and the initiation slide 40 ensure that the initiation slide 40 either allows movement of the locking catches 35 (as shown in the FIGURE—the tensile load on the load line being below the predefined limit value, and the projections 36, 41 therefore being offset with respect to one another) or blocks it. In the latter case, the load on the load line is greater than the predefined limit value, and the two projections 36, 41 are the same height.

A piston 20 is located in the slide housing 10 with axially moving activation slides 25 attached to it. On the other side of the piston 20, the latter is connected to a rod 23, which is connected to the line connecting body 1 for connection of the parachute line. The piston 20 divides the slide housing 10 into two subareas 15, 16, both of which are filled with an incompressible liquid (for example, damping oil). There is a thin hole 22 in the piston 20, through which the liquid can flow from one subarea to the other within the housing 10.

In operation, the piston 20 is forced upwards by the opening shock of the parachute, and then by the weight of the load. In addition to these tensile forces, the size of the slide housing 10, the diameter of the hole 22 and the viscosity of the liquid govern the time which passes after the opening shock occurs until the activation slide 25, which is connected to the piston 20, releases the locking catches 35 at the position B. In the illustrated state, the piston 20 is at its initial position in order to be adjacent to the closure plate 11 of the slide housing 10, as a result of which the locking catches 35 are blocked.

A safety spring 12 between the closure plate 11 of the slide housing 10 and the activation slide 25 ensures that the activation slide 25 remains in the illustrated state, or returns to it, and tension is applied to the line during handling and packing of the parachute.

The load disconnection lock is activated when the activation slide 25 no longer blocks the locking catches 35 because of the movement of the piston 20 under load. Unlocking of the locking catches 35 and therefore disconnection of the load are impossible in the activated state of the load disconnection lock for as long as the load on the parachute pulls the initiation slide downwards against the force of the load springs 38, and thus blocks the locking catches 35 at the point A. As a result, the catches 35 must remain in the locked state.

Only when the tensile force on the line falls below a limit on landing (which limit allows the load springs 38 to force the initiation slide 40 upwards in the catch housing 30) are the locking catches 35 released, both at the position B and at the position A. They pivot inwards under the force of the unlocking springs 37, disconnect the slide housing 10 from the catch housing 30, and release the load.

The desired delay time can be set as required by the choice of the size and volume of the slide housing 10, the diameter of the hole 22 and the viscosity of the liquid. In the same way, the force below which the load disconnection lock is released can be chosen freely by the force of the load springs 38.

An anti-twist bearing 50 on the inside of the upper, cylindrical, line connecting body 1 ensures that the parachute and load line cannot become twisted with one another.

The load disconnection lock can be assembled again by pushing the activation slide 25 upwards against the force of the safety spring 12, placing it on the catch housing 30 in this state, and compressing it until the activation slide 25, which bears downwards, has forced the locking catches 35 outwards to the locked state. The activation slide is inclined—with respect to its movement direction—in order to make it easier to force the catches 35 apart progressively in this way.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A load disconnection lock comprising:
   a locking device;
   a first safety device which secures said locking device against unlocking as long as a tensile load applied thereto equals or exceeds a predefined minimum value, and which unlocks automatically when the tensile load is less than the predefined minimum value; and
   a second safety device having a fluid-filled housing in which a piston is guided; wherein,
   said piston is configured to have a tensile load applied to it and has a hole as a flow channel for the fluid, such that the fluid can be exchanged between two housing subareas on both sides of the piston; and
   the piston is connected to an activation slide which releases the locking device as soon as the piston has moved through a predetermined distance.

2. The load disconnection lock according to claim 1, further comprising a safety spring that is disposed between a closure plate of the housing and the slide.

3. The load disconnection lock according to claim 1, further comprising a plurality of line connecting bodies for connecting a parachute line and load line; wherein at least one of the line connecting bodies has an anti-twist bearing.

* * * * *